(12) United States Patent
Keidar et al.

(10) Patent No.: US 9,723,351 B2
(45) Date of Patent: Aug. 1, 2017

(54) WEB SERVER TV DONGLE FOR ELECTRONIC DEVICE

(75) Inventors: Ron Keidar, San Diego, CA (US); Igor Malamant, San Diego, CA (US); Yitzhak Sabo, Mizpe Aviv (IL); Tomer Rafael Ben-Chen, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 633 days.

(21) Appl. No.: 12/857,850

(22) Filed: Aug. 17, 2010

(65) Prior Publication Data

US 2012/0047277 A1 Feb. 23, 2012

(51) Int. Cl.
| | | |
|---|---|---|
| G06F 15/16 | (2006.01) |
| H04N 21/418 | (2011.01) |
| H04N 5/50 | (2006.01) |
| H04N 21/41 | (2011.01) |
| H04N 21/414 | (2011.01) |
| H04L 29/08 | (2006.01) |
| G06F 13/38 | (2006.01) |
| G06F 9/44 | (2006.01) |

(52) U.S. Cl.
CPC ....... *H04N 21/4183* (2013.01); *H04L 67/025* (2013.01); *H04N 5/50* (2013.01); *H04N 21/4122* (2013.01); *H04N 21/41407* (2013.01); *G06F 9/4411* (2013.01); *G06F 13/385* (2013.01)

(58) Field of Classification Search
USPC ........................................................ 709/230
See application file for complete search history.

(56) References Cited

U.S. PATENT DOCUMENTS

| | | | |
|---|---|---|---|
| 6,941,340 B2* | 9/2005 | Kim et al. ................. | 709/203 |
| 7,107,071 B1 | 9/2006 | Kwon et al. | |
| 2004/0252246 A1 | 12/2004 | Lee | |
| 2005/0140790 A1 | 6/2005 | Min et al. | |
| 2005/0235329 A1* | 10/2005 | Karaoguz et al. .......... | 725/81 |
| 2006/0028582 A1* | 2/2006 | Zahn ........................... | 348/552 |
| 2006/0242346 A2* | 10/2006 | Vuong ........................ | 710/302 |
| 2006/0263043 A1 | 11/2006 | Kang | |

(Continued)

FOREIGN PATENT DOCUMENTS

| | | |
|---|---|---|
| CN | 101393538 A | 3/2009 |
| CN | 201248092 | 5/2009 |

(Continued)

OTHER PUBLICATIONS

Minard et al., "Integrated broadband antenna for USB digital Terrestrial TV receiver," IEEE Antennas and Propagation Society International Symposium, pp. 4365-4368 (Jul. 2006).
Digital Freeview TV Dongle, http://www.amazon.co.uk/DIGITAL-STICKUSB-STICK-VIDEO-CAPTURE/dp, printed Feb. 1, 2010, 3 pp.
USB digital tv stick/DVB-T dongle, http://www.alibaba.com/product-gs, printed Feb. 1, 2010, 2 pp.

(Continued)

*Primary Examiner* — Hua Fan
(74) *Attorney, Agent, or Firm* — Brent A. Boyd

(57) ABSTRACT

This disclosure describes devices, systems and techniques relating to a dongle device that is designed to provide broadcast video capabilities to an electronic device. In one example, a dongle device is configured to communicatively couple to an electronic device, wherein the dongle device comprises a multimedia receiver that receives a broadcast that includes multimedia data, and a web server that communicates the multimedia data to a web browser of the electronic device.

10 Claims, 5 Drawing Sheets

(56) References Cited

U.S. PATENT DOCUMENTS

| | | | |
|---|---|---|---|
| 2007/0025393 A1 | 2/2007 | Jeong et al. | |
| 2007/0113260 A1 | 5/2007 | Pua et al. | |
| 2008/0036854 A1* | 2/2008 | Elliott et al. | 348/55 |
| 2009/0027561 A1 | 1/2009 | Cytera | |
| 2009/0074387 A1 | 3/2009 | Adachi | |
| 2009/0138575 A1 | 5/2009 | Lin et al. | |
| 2009/0157727 A1 | 6/2009 | Paila | |
| 2009/0199283 A1 | 8/2009 | Jain | |
| 2010/0077443 A1 | 3/2010 | Wang | |

FOREIGN PATENT DOCUMENTS

| | | | |
|---|---|---|---|
| CN | 101480019 A | | 7/2009 |
| CN | 201352827 | | 11/2009 |
| EP | 1182820 A2 | | 2/2002 |
| EP | 1619857 A1 | | 1/2006 |
| EP | 1633133 A2 | | 3/2006 |
| JP | 2005006284 A | | 1/2005 |
| JP | 2006033763 A | | 2/2006 |
| JP | 2009075679 A | | 4/2009 |
| JP | 2010176494 A | | 8/2010 |
| WO | WO0115443 A1 | | 3/2001 |
| WO | WO-2009011032 A1 | | 1/2009 |
| WO | 2009044323 A2 | | 4/2009 |

OTHER PUBLICATIONS

"Exclusive: Infinitec demonstrates IUM ad hoc streaming device, makes it look like a flash drive" by Darren Murph posted Jan. 7, 2010, www.engadget.com, 3 pp.

"Infinitec details Infinite USB Memory Device functionality ahead of launch" by Darren Murph posted Feb. 18, 2010, www.engadget.com, 3 pp.

"Universal Serial Bus Communications Class Subclass Specification for Ethernet Emulation Model Devices," CDC Ethernet Emulation Model, Revision 1.0, Feb. 2, 2006, www.usb.org/developers/devclass_docs/CDC_EEM10.pdf, pp. 1-42.

"Universal Serial Bus," Wikipedia Encyclopedia, www.en.wikipedia.org/wiki/Universal_Serial_Bus#Connector_types, Aug. 4, 2010 version, pp. 1-31.

"Introduction to USB on-the-go," www.usb.org/developers/onthego, printed on Aug. 4, 2010, p.

International Search Report and Written Opinion—PCT/US2011/048147, International Search Authority—European Patent Office—Sep. 30, 2011.

Nikkei Linux: "Short-Term Intensive Serialization: Shin-Shirobako 'GLAN Tank' Enables Even This, Final Installment", the Edition for Jun. 2006, vol. 8 (6), Nikkei Business Publication, Inc., Jun. 8, 2006, pp. 80-86, ISSN: 1345-0182.

* cited by examiner

WEB SERVER TV DONGLE FOR ELECTRONIC DEVICE

TECHNICAL FIELD

The disclosure relates to electronic devices and dongle devices designed to be coupled to electronic devices in order to provide additional functionally to electronic devices.

BACKGROUND

Consumer electronic (CE) devices generally refer to any electronic devices used by consumers in business or normal everyday life, e.g., for entertainment, communication, productivity or the like. Examples of CE devices include mobile phones, smartphones, personal digital assistants (PDAs), wireless phones, femtocells, laptops, smartbooks, netbooks, notepad computers, ultra mobile personal computers, mobile internet devices, digital cameras or camcorders, navigation devices, eBook readers, watches, digital music players, digital picture frames, handheld gaming devices, electronic educational devices, video recorders and portable media players. New types of CE devices continue to emerge every year.

CE devices typically may have limited functionality. Dongle devices are often used to expand the functionality of CE devices. Dongle devices are typically small hardware devices designed to communicatively couple to CE devices in order to expand the functionality of the CE devices. For example, dongle devices may provide additional storage or new wireless capabilities to the CE devices. Dongle devices may also provide a wide variety of other features or functionality that the CE devices could not otherwise achieve. New types of dongle devices and new features that such devices can provide to CE devices continue to emerge.

SUMMARY

This disclosure describes devices, systems and techniques relating to a dongle device designed to provide broadcast video capabilities to an electronic devices, such as a consumer electronics (CE) device. The dongle device may include a multimedia receiver designed to receive broadcasts of multimedia content, such as broadcast television (TV). To interact with the dongle device, the electronic device may not require a conventional device driver specifically designed for the electronic device. Instead, the dongle device may be configured to include a web server, and the web server of the dongle device may be designed to interact with a web browser application executing on the electronic device. Accordingly, a wide variety of electronic devices that have a port for attaching a dongle device, video capabilities, and a web browser, may be able to interact with the dongle device in order to deliver broadcast television (TV) services to the electronic device. The interaction between the electronic device and the dongle device may not require an additional driver on the electronic device for interaction with the dongle device. Rather, the electronic device may essentially view the dongle device as a computer that is part of the Internet and accessible by the browser via the port of the electronic device.

In one example, this disclosure describes a method. The method may comprise receiving a broadcast that includes multimedia data at a receiver of a dongle device, wherein the dongle device communicatively couples to an electronic device. The method may also comprise communicating the multimedia data to a web browser of the electronic device via a web server in the dongle device.

In another example, this disclosure describes a dongle device configured to communicatively couple to an electronic device. The dongle device may comprise a multimedia receiver that receives a broadcast that includes multimedia data, and a web server that communicates the multimedia data to a web browser of the electronic device.

In another example, this disclosure describes a dongle device comprising means for receiving a broadcast that includes multimedia data at a dongle device, wherein the dongle device communicatively couples to an electronic device, and means for communicating the multimedia data from the dongle device to a web browser of the electronic device.

In another example, this disclosure describes a system comprising an electronic device including a web browser, and a dongle device comprising a multimedia receiver that receives a broadcast that includes multimedia data, and a web server that communicates the multimedia data to the web browser of the electronic device.

The techniques described in this disclosure may be implemented at least in partially in hardware, possibly using aspects of software or firmware in combination with the hardware. If implemented partially in software or firmware, the software or firmware may be executed in one or more hardware processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution in a processor of a dongle device. The instructions may cause the dongle device to, upon receiving a broadcast that includes multimedia data at a receiver of the dongle device, wherein the dongle device communicatively couples to an electronic device, communicate the multimedia data to a web browser of the electronic device via a web server in the dongle device.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes devices, systems and techniques relating to a dongle device that is designed to provide broadcast video capabilities to an electronics device, such as a consumer electronics (CE) device. The dongle device may include a multimedia receiver designed to receive broadcasts of multimedia content, such as broadcast television (TV) or wireless broadcasts such as FLO-TV. To interact with the dongle device, the CE device does not require a conventional device driver specifically designed for the CE device. Instead, the dongle device is configured to include a web server, and the web server of the dongle device is designed to interact with a web browser executing on the CE device. Accordingly, a wide variety of CE devices that include a port for attaching a dongle device, video capabilities, and a web browser, may be able to interact with the dongle device in order to deliver broadcast TV to the CE device. The CE device may essentially view the dongle device as a computer that is part of the Internet and accessible by the browser via the port of the CE device.

Figure 1:
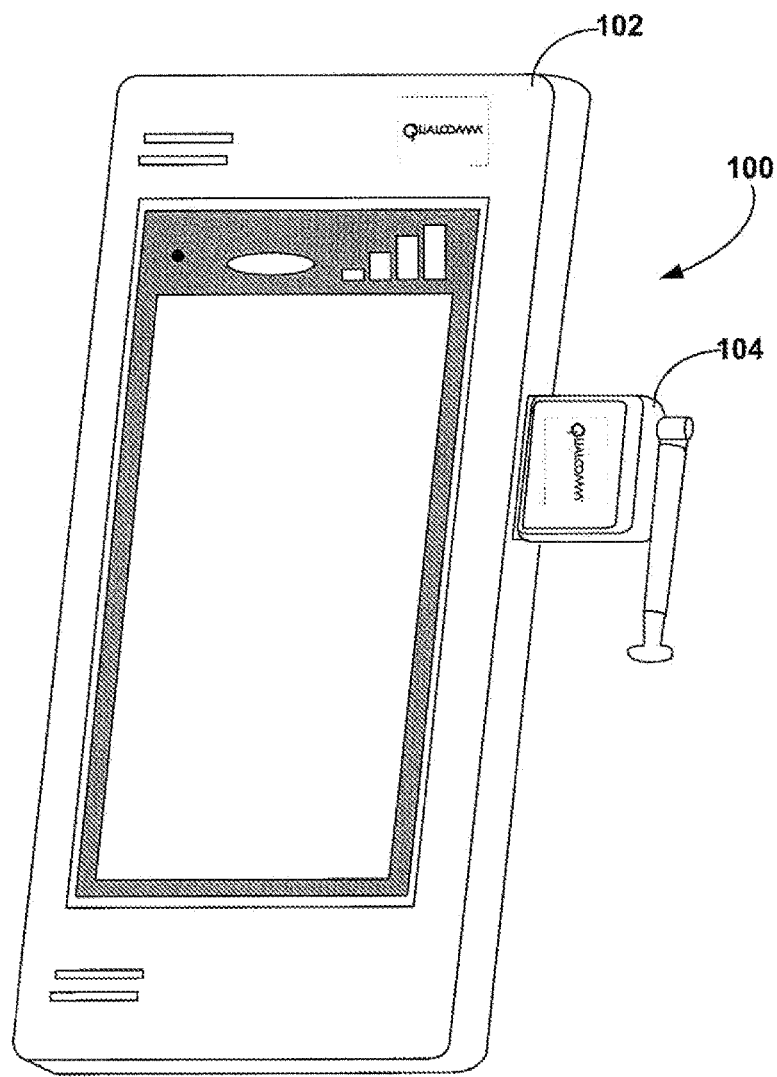
FIG. 1 is a perspective view of a system that includes a consumer electronics (CE) device and a dongle device communicatively coupled to the CE device.

FIG. 1 is a perspective view of a system 100 that includes a consumer electronics (CE) device 102 and a dongle device 104 communicatively coupled to CE device 102. In one example, dongle device 104 includes an embedded web server and a broadcast TV tuner, and can be used to provide broadcast TV content to CE device 102 over a universal serial bus (USB) connection, which could be a wired or wireless USB connection. CE device 102 may include a web browser that is used to access the embedded web server on dongle device 104. CE device 102 may be capable of processing video files and displaying the corresponding video content (video streaming support), and may be capable of receiving Ethernet packets or Internet Protocol (IP) packets over the USB interface. Dongle device 104 may be configured to receive broadcast TV content, including channel video content and channel scheduling information, via an antenna and TV receiver, and uses the embedded web server, which may include a hypertext transfer protocol (HTTP) server and a real time transfer protocol (RTP) server, to provide HTML screens or streaming video to a web browser application of CE device 102. In other examples, HTTP steaming, real time messaging protocol (RTMP), or other protocols could be used to deliver video content from the server of dongle device 104 to the browser of CE device 102. The actual content sent from dongle device 104 according to such protocols may include streaming video, but may also include such things as program guide information, advertisements, logos, channel selection information and capabilities, scheduled recording information and capabilities, and other features.

Both dongle device 104 and CE device 102 may support communications via a transmission control protocol/internet protocol (TCP/IP) stack and may include USB drivers that enable Ethernet or IP packets to be sent or received via the USB interface. TCP/IP may refer to any of a family protocols commonly referred to as TCP/IP. Also, user datagram protocol/internet protocol (UDP/IP) could also be used for communications between dongle device 104 and CE device 102, as well as other IP datagrams. Content provided by dongle device 104 may be prepared by its server (e.g., an HTTP and/or RTP server), formatted according to the TCP/IP stack and USB stack layers, and transmitted over the USB interface to CE device 102. The USB stack layers and TCP/IP stack may be processed by CE device 102 and forwarded to an embedded web browser on CE device 102, where the content may be rendered as a channel selection screen, as a channel selection feature on a streaming video screen, or both.

The techniques of this disclosure are generally applicable to a wide variety of CE devices that can communicate with the dongle device. Although CE device 102 is illustrated as a smartphone in FIG. 1, other examples of CE devices include mobile phones, smartphones, personal digital assistants (PDAs), wireless phones, femtocells, laptops, smartbooks, netbooks, notepad computers, ultra mobile personal computers, mobile internet devices, digital cameras or camcorders, navigation devices, eBook readers, watches, digital music players, digital picture frames, handheld gaming devices, electronic educational devices, video recorders and portable media players. New types of CE devices continue to emerge every year, and such new CE devices could also benefit from dongle device 104 described herein. Furthermore, the dongle device of this disclosure may be used with other electronic devices, and is not limited to use with CE devices.

Many CE devices have video capability, but do not have an embedded broadcast TV receiver and broadcast TV reception capability. In many cases, development, manufacturing, and others costs associated with providing embedded broadcast television reception capability for the CE devices may be prohibitive. In addition to hardware costs and space considerations associated with providing an embedded broadcast TV receiver and antenna within a CE device, software development costs to support such a broadcast TV receiver can be significant. Such costs can include efforts to develop software drivers for interfacing with broadcast reception hardware, for example, and may also include costs associated with developing or supporting a user interface associated with the broadcast television functionality.

However, many CE devices already include a USB interface port and a web browser. Also, the CE devices often include software designed to access multimedia data, or other files stored on a memory or mass storage device via the USB port, including software designed to receive video data in a particular format from the memory storage device, process the received video data, and display the corresponding video content. For example, the CE devices may include a USB driver that allows Ethernet packets or IP packets to be received over the USB port of the device. In other cases, the CE device may not include such a driver, but upon attachment of the dongle device disclosed herein, the USB driver to be loaded from the dongle device to the CE device via the USB port.

This disclosure describes a computing device referred to herein as a dongle device (e.g., shown as dongle device 104 in FIG. 1), that can provide broadcast TV reception functionality to any of the aforementioned CE devices (or other electronic devices) via the USB port of CE device 102, and can generally do so without having to retrofit CE device 102 with software drivers to interface with the dongle device (except perhaps the aforementioned USB driver for Ethernet or IP packets). That is, the dongle device can be attached to the CE device via the USB port of the CE device, and the dongle device can interface with the CE device to provide broadcast TV functionality via standard or proprietary interface protocols already present on the CE device. In particular, dongle device 104 may provide data streams representative of broadcast television signals in a format that CE device 102 is already configured to process, and can do so using an interface protocol that CE device 102 is already equipped to implement.

For example, dongle device 104 may communicate, via an interface over the USB port using the embedded web server on dongle device 104, descriptors of uniform resource locators (URLs), and channel format types representative of broadcast television channels. Dongle device 104 may further communicate data streams formatted in a format type readable by CE device 102 via the interface over the access port (e.g., where the provided data streams correspond to broadcast television signals received by dongle device 104). The communicated streams can include audio streams, video streams, image files, video files or hypertext transfer markup language (HTML) files, and the browser within CE device 102 may interpret the provided stream (or file) and display corresponding content on a display screen of CE device 102. Extended markup language (XML) files or other internet deliverable files may also be used.

In some aspects, dongle device 104 may initially represent itself as a storage device, such as a CD-ROM device or flash memory stick, to CE device 102. This may enable an auto-install of, for example, a driver from dongle device 104 to the CE device (e.g., the driver for receiving Ethernet/IP over USB if the CE device does not already include such a driver). The browser on CE device 102 may be configured to automatically access a uniform resource locator (URL) associated with the web server on dongle device 104. For example, a URL with an appropriate description may be saved as a browser "favorite" on CE device 102, and may include address information that permits the browser of CE device 102 to communicate with the web server of dongle device 104. Instructions may be included with dongle device 104 to assist a user in configuring the browser of CE device 102 regarding the aforementioned URL, for example, or an application may be loaded from dongle device 104 to CE device 102 after the broadcast device is attached via the USB port to accomplish the same.

Dongle device 104 may provide one or more channel descriptors that indicate one or more broadcast television channels that the dongle device 104 can receive. In some cases, the dongle device 104 may scan for available channels prior to providing a list of channel descriptors to CE device 102, and may provide channel descriptors representative of those channels for which reception is currently available. Dongle device 104 may supplement information received over a broadcast channel with information (e.g., channel information) stored on dongle device 104. CE device 102 may then display the received list of channel descriptors, and a user may select one of the displayed channel descriptors using the browser of CE device 102. CE device 102 may provide dongle device 104 with an indication of the selection, and dongle device 104 may tune to the appropriate channel associated with the selection, receive multimedia data from that channel, and deliver streaming data to the browser of CE device 102. The channels may be represented by a URL in some examples. For example, the channel could be a real-time stream of information represented by a URL, such as: file:///webtv/chanel01/program.avi. Also the URL might also identify the channel being requested and extra parameters for the receiver, such as close captioning enable/disable or the requested resolution. Another example URL may be take a format similar to: http://webserver/watch?channel10&cc=true&resolution=640×480.

Dongle device 104 may use its embedded web server to convert a received broadcast television signal into a format readable by CE device 102 (e.g., HTML data, XML data, or data configured as RTP packets), and may provide the converted signal to CE device 102 so that the corresponding content can be displayed via the web browser on CE device 102. In this fashion, the dongle device 104 may provide data streams corresponding to real-time broadcast television signals to CE device 102 for display on CE device 102. The streams may be communicated from dongle device 104 to CE device 102 in a multimedia format accessible to CE device 102, and CE device 102 need not include specialized hardware or software dedicated to receiving or processing broadcast television signals. Dongle device 104 may also establish content protection with CE device 102 using standard solutions such as those used in the real time streaming protocol (RTSP) or hypertext transfer protocol secure (HTTPS), or other content protection protocols or solutions associated with video content.

Dongle device 104 may include a receiver or broadcast engine configured to receive broadcast television signals via an antenna, which may also be included with the broadcast device. Dongle device 104 may also include one or more processors and one or more memory storage devices (e.g., volatile, non-volatile, or both) that include instructions stored thereon that when executed perform the techniques described herein. Dongle device 104 may include an embedded web server with HTTP server functionality and RTP server functionality, and the capabilities to generate a TCP/IP stack. Dongle device 104 may include USB driver modules that enable dongle device 104 to transmit Ethernet packets or IP packets over the USB interface to CE device 102.

In various aspects, dongle device 104 may provide various multimedia file formats to the CE device, including but not limited to .MP4, .MPEG, Windows Media Video (.WMV), .3GP, .3P2, .FLV, .AVI, .FLV, .MOV, .WAV, .OGG, .MPC, .FLAC, .AIFF, .RAW, .AU, .GSM, .DCT, .VOX, .AAC, .MP4, .MMF, .MP3, .WMA, .RA, .RAM, .DSS, .MSV, .DVF, .IVS, .M4P, .IKLAX, .MPX4, .3GP, .AMR, .AWB, .FITS, .TIFF, .ANIM, .ASF, .CDXL, .DVR-MS, .IFF, .MKV, .MJ2, .OGM, realMedia, .NUT, .MXF, .GXF, .ratDVD, .SVI, .VOB, DivX, and the like. In this disclosure, the term "multimedia data" includes video data, audio data or still image data, as well as combinations of video data, audio data and/or still image data. The browser of the CE device may include a codec for decoding files according to one or more of such formats.

Dongle device 104 may provide a program guide, which may be in the form of an HTML file that lists available television channels. The program guide may be received by dongle device 104 as part of the received broadcast. In some cases, available channels may be represented as a URL, which may include descriptors, channel name and possibly a file extension. For example, a URL may take a format similar to http://webtv/watch?channel=10 or http://webtv/channel10.avi. In other examples, the descriptors may have a "ChannelName.FormatType" format (e.g., .CNN.MP4, .ESPN.WMV, etc.). In other examples, the descriptors may have a format similar to "ChannelName.FormatType" where ChannelName defines the name of the channel and FormatType defines the type of video file. Examples of descriptors include.CNN.MP4, and ESPN.WMV. In other examples, a list of available channels and a list of supported format types may be separately communicated by dongle device 104 to CE device 102. In some cases, a logo corresponding to the channel may be communicated by dongle device 104 to CE device 102. In some cases, an indication of a program currently playing on a particular channel may be communicated by dongle device 104 to CE device 102. Such an indication can include a textual description, or a representative image or video clip.

Dongle device 104 may include non-volatile storage media for storing multimedia content. For example, dongle device 104 may use a non-volatile storage media to store received broadcast television signal data in a compressed or uncompressed format. In some cases, dongle device 104 may include an encoder and CE device 102 may include a reciprocal decoder so that data compression may be achieved in the communications between dongle device 104 and CE device 102. Thus, in various aspects, the data may be stored prior to converting a received signal to one of the aforementioned video formats, or may be stored following such a conversion. The stored files on dongle device 104 may be made available to CE device 102 for viewing on CE device 102 via a browser. In this fashion, dongle device 104 may include functionality similar to a DVR, where a user may select programs to be recorded and stored for later viewing, or where dongle device 104 may automatically record and store programs according to user preferences (whether saved by the user or learned from previous user activity, for example). In other cases, dongle device 104 may coordinate the recording of multimedia data, but may store recorded multimedia data in a memory of CE device 102. In some examples, dongle device 104 may be able to access the data network over the Internet, and provide such content to CE device 102, in addition to the aforementioned broadcast TV content. In such cases, dongle device 104 may integrate wireless modem capabilities for internet access, in addition to a broadcast receiver for receiving the broadcast TV content.

If recording of content is supported, features may be supported by dongle device 104 to facilitate the communication to CE device 102 with respect to scheduling of recordings or immediate recordings, display of recorded programs, and playback of recorded programs. Digital right management (DRM) may be implemented to prevent illegal copying of recorded content to or from other memory or storage formats.

To facilitate reception of broadcasted multimedia data, dongle device 104 may include an antenna and a multimedia receiver. The multimedia receiver may correspond to any of a wide variety of broadcast receivers, supporting reception of one or more of the following formats: the Advanced Television Systems Committee (ATSC) format, the Digital Video Broadcasting (DVB) format, the Terrestrial Digital Multimedia Broadcasting (T-DMB) format, the Integrated Services Digital Broadcasting Terrestrial (ISDB-T) format, or the Moving Picture Experts Group Transport Stream (MPEG-TS) format, provided by International Standard ISO/IEC 13818-1, to name only a few. ATSC standards are a set of standards developed by the Advanced Television Systems Committee for digital television transmission. DVB standards are a suite of internationally accepted, open standards for digital television, and are published by a Joint Technical Committee (JTC) of European Telecommunications Standards Institute (ETSI), European Committee for Electrotechnical Standardization (CENELEC), and European Broadcasting Union (EBU). Digital Multimedia Broadcast (DMB) is a digital radio transmission technology for sending multimedia data to mobile devices. Integrated Services Digital Broadcasting (ISDB) is a Japanese standard for digital television and digital radio that could also be supported. Other wireless standards that could also be supported by dongle device 104 may include mobile broadcast standards such as the Advanced Television Systems Committee—Mobile/Handheld (ATSC M/H) standard, the FLO-EV standard, the Digital Multimedia Broadcast-handheld (DVB-H) standard, the Digital Multimedia Broadcast-satellite services to handheld (DVB-SH) standard, and next generation mobile broadcast standards. In addition, analog standards such as the National Television System Committee (NTSC) standards and next generation NTSC standards may be supported by a dongle device 104 as described in this disclosure. Also, standards such as third-generation multimedia broadcast multicast service (3G MBMS), Broadcast and Multicast Services (BCMCS), long term evolution broadcast (LTE(broadcast)), or numerous other standards may benefit as well. With these and other standards, dongle device 104 may facilitate reception of multimedia data and delivery of content to a browser of CE device 102.

In general, the market of consumer electronics has many products with video capability, USB capability and web browsing capabilities. However, many existing devices do not have any broadcast TV receiver. In some applications, dongle device 104 can provide an aftermarket solution to add on broadcast TV capabilities to any such CE device. Dongle device 104 may come in various form factors and support a variety of interfaces such as standard USB, mini USB, micro USB, standard secure digital (SD), mini SD, micro SD, or other memory card or dongle form factors. In general, the dongle device of this disclosure is not limited to any specific size, shape or form factor.

One problem with an add-on receiver is that traditionally they may require a dedicated application to run on the CE device so as to manage the dongle device. However, because there are so many CE devices available, and many of these devices do not have the quantities or market penetration that would justify development of software applications for every different device, the result is that only few devices may be compatible with conventional dongle devices. Dongle device 104 of this disclosure may solve such problems by eliminating the need of dongle drivers on the CE side. In some cases, dongle device 104 can provide broadcast video services to a CE device that includes only the following standard capabilities:

1—a web browser
2—video steaming support; and
3—an internet adaptor over USB or another interface.

Dongle device 104 may provide an internet interface according to the Class Definition for Communication Devices/Ethernet Control Model (CDC/ECM), the Class Definition for Communication Devices/Network Control Model (CDC/NCM), the Class Definition for Communication Devices/Ethernet Emulation Model (CDC/EEM) or the Remote Network_Driver_interface_Specification (RNDIS), although other types of interfaces could also be used.

Figure 2:
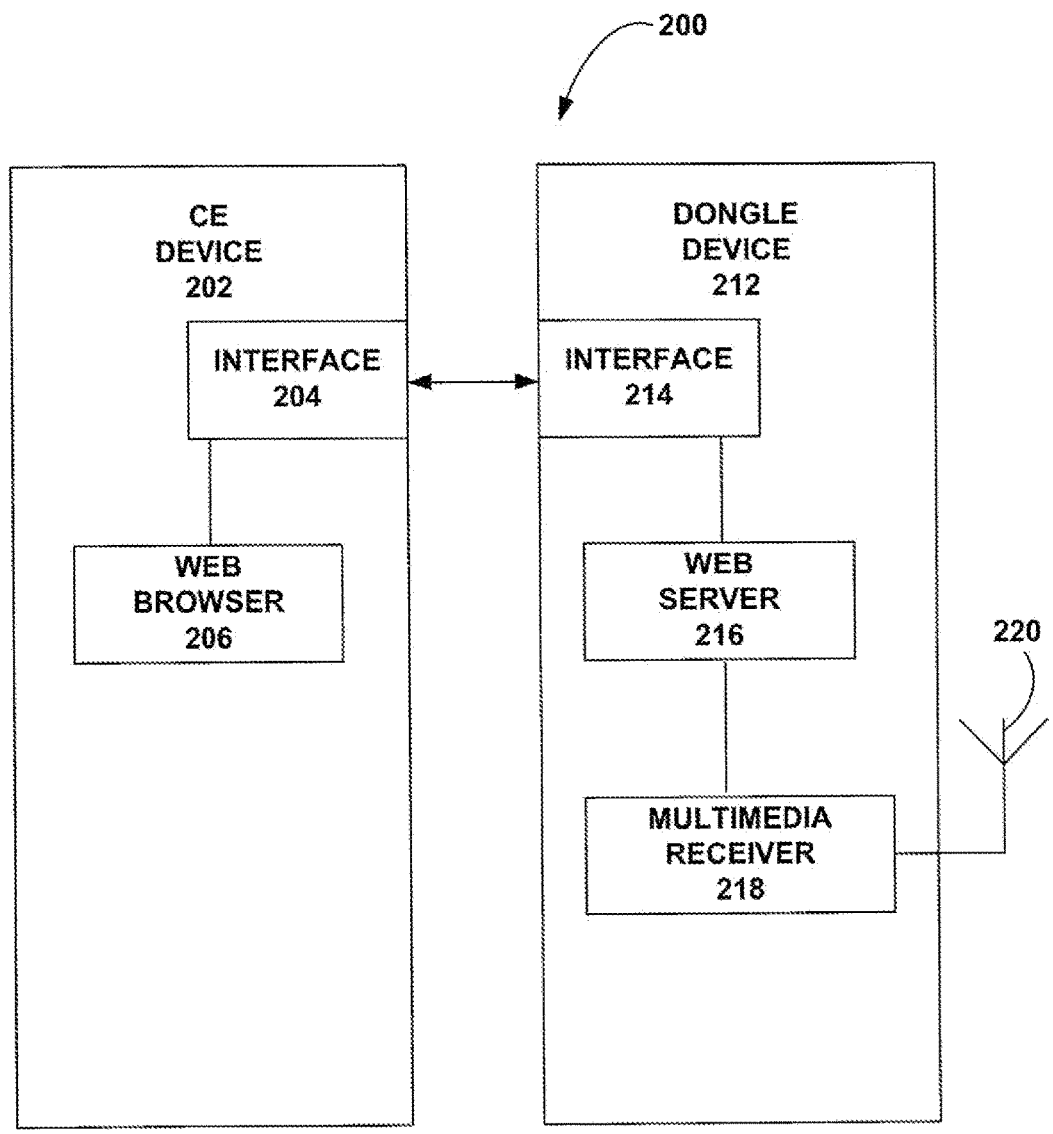
FIG. 2 is a block diagram of a system that includes a CE device and a dongle device consistent with this disclosure.

FIG. 2 is a block diagram of a sysetem 200 consistent with this disclosure. System 200 may correspond to system 100 of FIG. 1 or may correspond to another system. System 200 comprises a CE device 202 including a web browser 206, and a dongle device 212 comprising a multimedia receiver 218 that receives a broadcast that includes multimedia data, and a web server 216 that communicates the multimedia data to the web browser of the CE device. CE device 202 and dongle device 212 may each include interfaces (204 and 214) to facilitate data communications, and in one example, interfaces 204 and 214 conform to one of the USB standards, such as USB 2.0 or USB 3.0. These interfaces may take the form of a physical bus and bus controllers on each side, and may include USB controllers, USB hardware, and USB drivers.

Multimedia receiver 218 is coupled to an antenna 220 and may comprise a broadcast TV tuner corresponding to one or more of the broadcast standards mentioned above or corresponding to another broadcast standard. Dongle device 212 communicatively couples to CE device 202 via a connector associated with interfaces 204 and 214, which may conform to the USB standard. In this case, web server 216 may communicate multimedia data to web browser 206 of CE device 202 through the USB connector associated with interfaces 204 and 214. Other connector standards could also be used. The USB connector described herein may conform to USB, USB 2.0, USB 3.0, or future extensions of USB. Firewire or other similar standards could also be used, although it would be desirable to ensure that the data rate of the connector standard is adequate for delivery of video data.

Web server 216 may comprise web server software executing on a processor of dongle device 212. Web browser 206 may comprise a web browser software application executing on a processor of CE device 202. Thus, web browser 206 may correspond to web browser software, or a processor of CE device 202 that executes such web browser software. Similarly, web server 216 may correspond to a web server software application executing on a processor of dongle device 212.

Web server 216 may communicate data via one or more different protocols and formats commonly used in internet communications, such as hypertext transfer protocol (HTTP), hypertext transfer protocol secure (HTTPS), hypertext markup language (HTML), extendable markup language (XML), real time transport protocol (RTP), secure real time transport protocol (SRTP) or other communication standards. In one example, web server 216 communicates multimedia data to web browser via RTP, but communicates web pages of channel information via HTTP/HTML. In still other examples, web server 216 communicates data to web browser 206 via an HTML 5 video protocol, a flash protocol, a real time messaging protocol (RTMP), or a hypertext HTTP streaming protocol. RTMP, for example, may be used to stream video from a web server of the dongle device to a flash player embedded in the web browser on the CE device. There are also other standards for streaming video that could gain popularity and be supported by devices, such as HTML5 video. HTML5 defines a new tag to embed a video stream in an HTML page.

In operation, web server 216 may receive a request from CE device 202 for the multimedia data, and may communicate the multimedia data to web browser 206 in response to the request. The request may be in the form of a Uniform Resource Locator (URL) sent from web browser 206, wherein the URL identifies the web server 216 of dongle device 212.

Dongle device 212 may be physically attachable and detachable from CE device 202. Interfaces 204 and 214 may comprise a connector and a corresponding port for physically and communicatively connecting dongle device 212 and CE device. Wireless interfaces could also be used. In one example, interface 214 comprises a physical USB connector on dongle device 212 and interface 214 comprises a corresponding USB port on CE device 202.

To initiate broadcast TV viewing at CE device 202, a user may select a channel through a menu screen displayed by web browser 206, and upon selecting a channel, the multimedia data of that channel may be communicated from web server 216 to web browser 206 via interfaces 214 and 204. Multimedia receiver 218 may receive channel information associated with different channels of the broadcast, and web server 216 may communicate the channel information to web browser 206 of the CE device 202. The channel information may be communicated from web server 216 to web browser 206 via HTTP, whereas multimedia communication from web server 216 to web browser 206 may occur according to RTP. Web server 216 may receive a channel selection from CE device 202, wherein the channel selection is sent from CE device 202 via web browser 206. Web server 216 may then select the multimedia data from the broadcast based on the channel selection, and communicate the multimedia data to web browser 206 in response to receiving the channel selection.

In order to use the capabilities of dongle device 212, a user may open a link, via web browser 206, that points to web server 216 of dongle device 212 and from there, web server 216 may manage the user interface, applications and service guide. Once the user selects a program via web browser 206, web server 216 may open an RTP connection with a media player of web browser 206 enable a video streaming similar to that used by YouTube.com, hulu.com, or other video servers or video web sites. Although not shown in FIG. 2, dongle device may also include a storage device so as to allow for recording and playback capabilities. Storage on CE device 202 might also be accessed by dongle device 212 and used for recording and playback capabilities. Content protection and service protection may also be managed at by web server 216 to reduce or eliminate copyright infringements, or for other reasons. Dongle device 212 could also include extensions or modems to allow dongle device 212 to interface with internet online video servers, and the modems may conform to Wi-Fi, High Speed Packet Access (HSPA), long term evolution (LTE), WiMAX, or other wireless protocols or standards.

Figure 3:
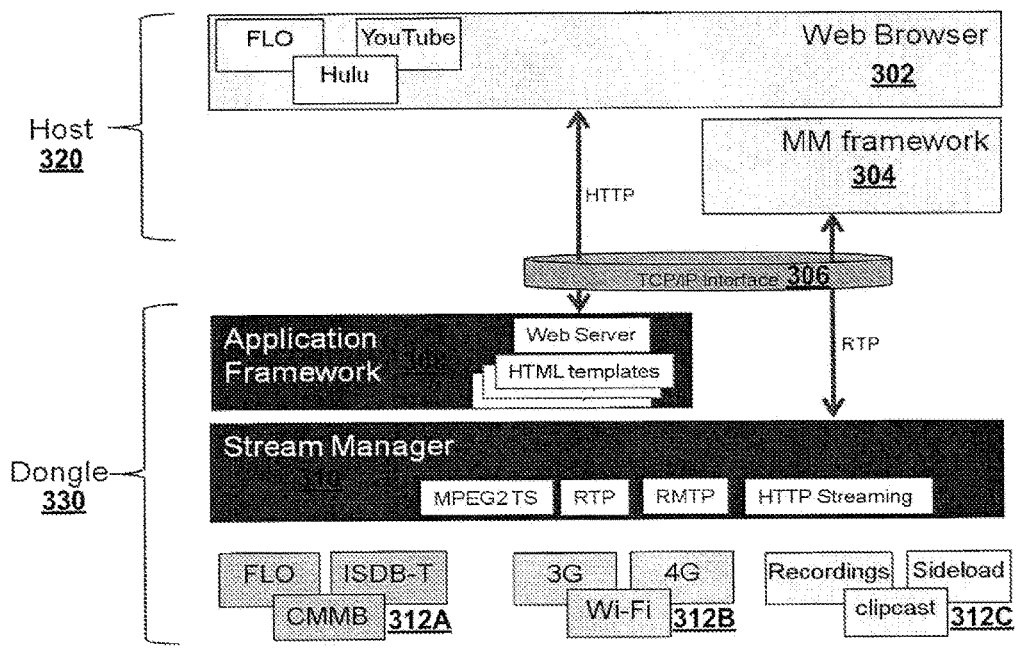
FIG. 3 is a conceptual diagram showing communication between a host (i.e., a CE device) and a dongle device consistent with this disclosure.

FIG. 3 is a conceptual diagram showing communication between a host (i.e., a CE device) and a dongle device consistent with this disclosure. Host 320 includes a web browser 302 that can support web viewing of URLs such as URLs associated with FLO-TV, Hulu and YouTube, to name a few. Multimedia (MM) framework 304 may comprise a streaming video plugin to web browser 302 so as to support the reception and display of video data RTP.

Dongle device 330 may include application framework 308 that includes a HTTP web server and various HTML pages (or templates). A stream manager 310 may comprise a video streaming server capable of delivering video streams according to MPEG-2, RTP, Real Time Messaging Protocol (RMTP), HTTP streaming, or the like. Application framework 308 and stream manager 310 may operate together to provide first video data 312A over a first service such as FLO, ISDB-T, CMMB, or second video data 312B over a second service such as 3G, 4G or Wi-fi, and/or third video data 312C, which may be recordings, clipcasts or slideloads, for example. A TCP/IP interface 306 may facilitate HTTP and RTP communications between dongle device 330 and host 320. In particular, application framework 308 of dongle device 330 may communicate with web browser 302 of host 320 via HTTP over TCP/IP interface 306, and stream manager 310 of dongle device 330 may communicate with MM framework 304 of host 320 via RTP over TCP/IP interface 306.

Figure 4:
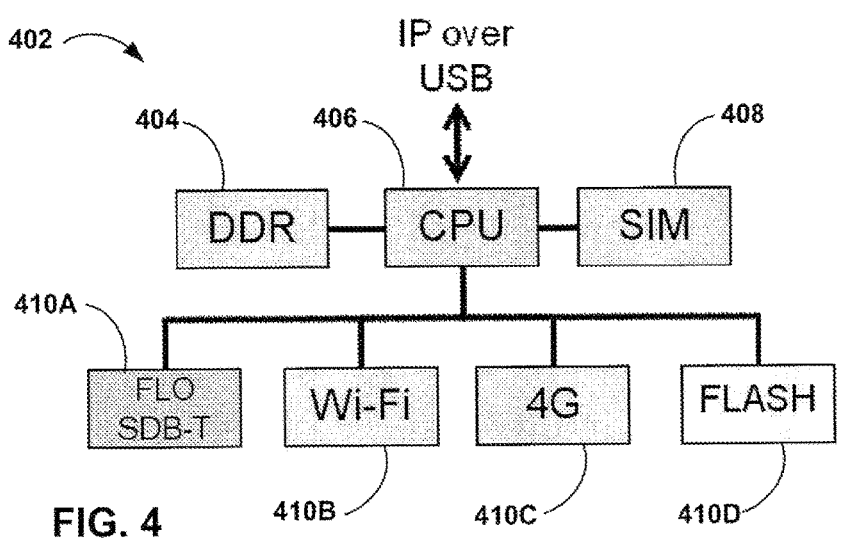
FIG. 4 is another block diagram illustrating an exemplary architecture of a dongle device consistent with this disclosure.

FIG. 4 is another block diagram illustrating an exemplary architecture of a dongle device consistent with this disclosure. In this example, dongle device 402 includes a central processing unit (CPU) 406, and possibly memory in the form of a single inline memory (SIM) module 408. Other types of memory could also be used, including Double Data Rate synchronous dynamic random access memory (DDR) 404. CPU may execute instructions to perform the techniques of this disclosure, and my include applications designed to support FLO and/or SBT-T 410A, wi-fi 410B, 4G wireless communication 410C and possibly flash memory 410D. With flash memory 410D or other memory, dongle device 402 may allow a CE device to use dongle device 402 as an external memory in addition to the other dongle device features described herein.

Figure 5:
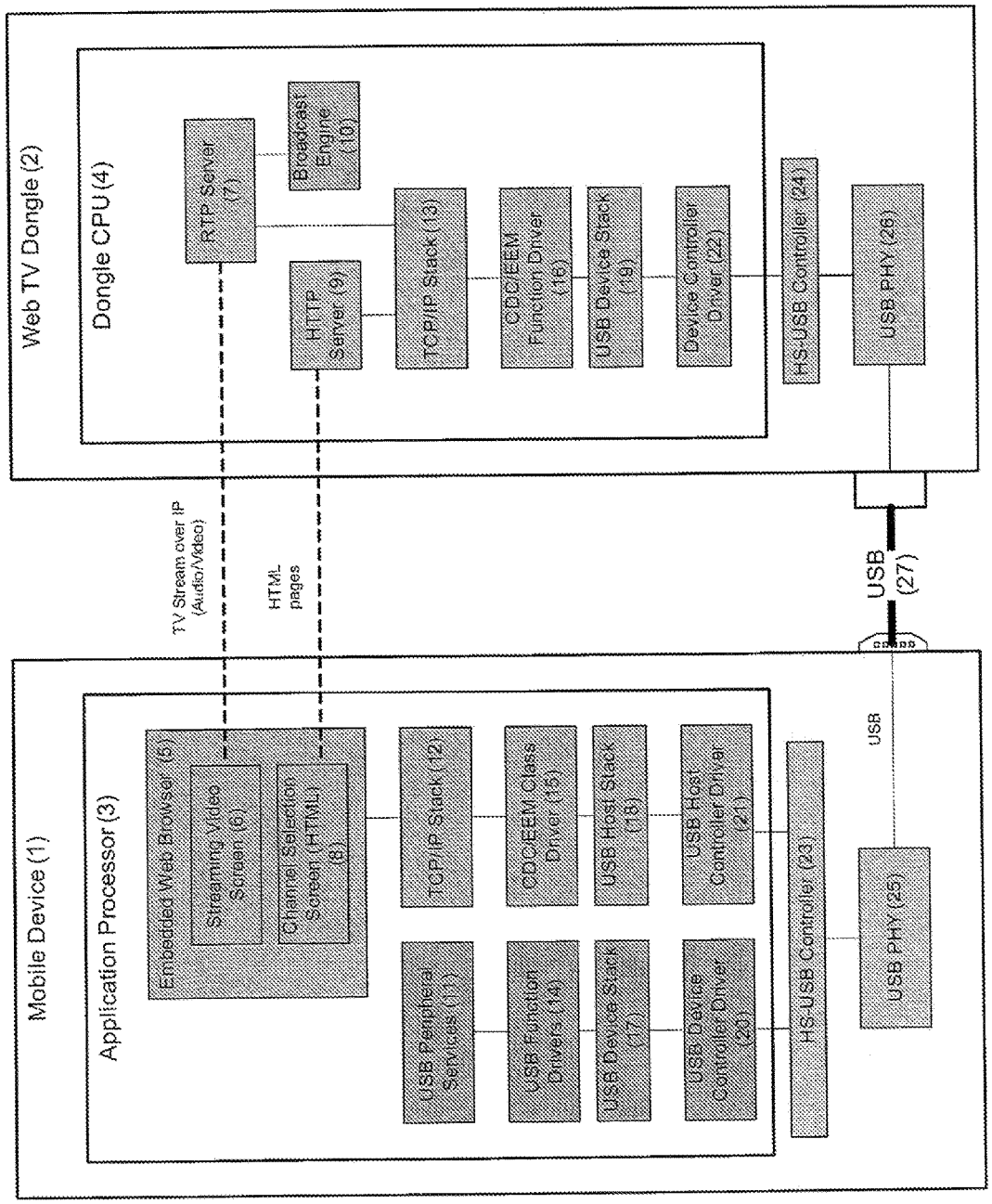
FIG. 5 is another block diagram of a system that includes a CE device and a dongle device consistent with this disclosure.

FIG. 5 is another block diagram of a system that includes a CE device and a dongle device consistent with this disclosure. Mobile device 1 may comprise a CE device that is mobile, such as a smartphone. Mobile device 1 can show high resolution TV broadcasts, but could also be any other consumer device described herein, with a reasonable screen quality and a USB Host or USB on the go (OTG) capabilities. WebTV dongle 2 is an example of a dongle device consistent with this disclosure, and may comprise a USB dongle device capable of receiving broadcast TV transmissions. Application processor 3 may comprise the main CPU unit on mobile device 1, and dongle CPU 4 may comprise the main CPU of the WebTV dongle 2.

Embedded web browser 5 may comprise any standard web browser capable of running on the mobile device and displaying generic HTML pages and streaming video feeds. Streaming Video Screen 6 may comprise a display element in embedded web browser 5 that shows the streaming video. RTP server 7 may comprise a software component on Web TV dongle 2 that accepts TCP/IP connection requests from the streaming video screen 6 and streams multimedia content decoded from the broadcast engine 10.

Channel Selection Screen 8 may comprise a display element in embedded web browser 5 that shows a selection of TV channels available and schedule of programs. Once a channel selection is made in this screen, the channel may be displayed on the streaming video screen 6. HTTP server 9 may comprise a software component on web TV dongle 2 that is capable of accepting TCP/IP connections from embedded web browser 5 of mobile device 1 and reply data from the TCP/IP connections. The reply data may comprise a set of HTML pages sent over the HTTP protocol. HTTP server 9 may be integrated with a number of supplemental web technology engines, such as JavaScript, PHP, Ruby on Rails, or other plug-ins or web engines. HTTP server 9 may so be capable of handling user commands sent from embedded web browser 5, such as a request to select a different channel or show additional programs.

Broadcast engine 10 may comprise hardware (such as an antenna and receiver tuned to receive broadcast multimedia data), as well as a set of software modules capable of decoding broadcast TV programming, channel data, and so forth. USB peripheral software (such as USB peripheral services 11, USB function drivers 14, USB device stack 17, and USB controller driver 20) may also be part of mobile device 1. Mobile device 1 may operate as either as a USB host (being the master of connected USB devices) or as a USB peripheral (when connected to PC host, for example).

TCP/IP stacks 12 and 13 may comprise software modules for the implementation of the TCP/IP protocol on mobile device 1 and Web TV dongle 2, respectively. The connectivity between mobile device 1 and WebTV dongle 2 may be established over a local IP subnet (such as, for example 192.168.0.0). The IP address of WebTV dongle 2 may be statically allocated in mobile device 1 in the factory, or configured in other ways. As another example, the IP address of WebTV dongle 2 may be dynamically assigned using a dynamic host confirmation protocol (DHCP). Mobile device 1 may have a preconfigured mapping of a symbolic name (such as "webtv") to the IP address of the WebTV dongle 2, which can enable users to have easy access to a WebTV dongle interface from embedded web browser 5.

CDC/EEM Class Driver 15 may comprise of USB driver that is designed to send and receive Ethernet frames over USB. CDC stands for "Communication Device Class," and EEM stands for "Ethernet Emulation Model." These types of USB drivers may present the USB connector an Ethernet adapter to the TCP/IP stack and may facilitate the exchange Ethernet frames between mobile device 1 and WebTV dongle 2. There may also be other alternative USB class drivers that can be used for similar functionality, including the communications device class/Ethernet control model (CDC/ECM,) the communications device class/network control model (CDC/NCM,) the Remote Network_Driver_interface_Specification (RNDIS), and others.

CDC/EEM function driver 16 may comprise software for implementation of the CDC/EEM class on the WebTV Dongle 2 as a peripheral. In USB terminology, "Class Driver" refers to the driver running on the USB Host, "Function Driver" refers to the driver running on the USB peripheral. Other examples of USB classes include "Mass Storage Class" for USB ThumbDrives and HardDisks or "Human Interface Device Class" for USB keyboard or mouse devices.

USB host stack 18 and USB device stack 19 may comprise software modules implementing generic USB protocol common to all USB device classes. Host controller driver 21 and device controller driver 22 may comprise the lowest level of USB driver software, directly accessing USB hardware registers and processing interrupts from the USB controller (which may be optional).

USB hardware elements, including (HS-USB controllers 23 and 24, and USB physical layer components 25 and 26) may comprise digital and analog hardware configured to operate according to the USB standard. A USB adapter or cable 27 may comprise a USB adapter from "Standard-A" plug on Web TV dongle 2, to a "micro-A" type or "mini-A" plug that can be plugged into mobile device 1. The use of a "Standard-A" plug on WebTV dongle 2 may enable a simple connection to PC hosts.

When WebTV dongle 2 is attached to mobile device 1, the various USB software described above may detect that WebTV dongle 2 is a USB peripheral device. Mobile device 1 may start supplying a 5V power source to WebTV dongle 2, which may powers up WebTV dongle 2. When WebTV dongle 2 is powered, its software may communicate over the USB physical cable 27 as a CDC/EEM device. Mobile device 1 may automatically load the corresponding CDC/EEM class driver and automatically launch embedded web browser 5 to the main page of the WebTV dongle 2. The main web page may display all the available video and audio channels, and possibly program schedules. Once a specific channel is selected by the user, the selected channel may start streaming on streaming video screen 6, which may be maximized to an entire screen area or sized as only part of the screen area. Audio may be likewise streamed to an audio device that drives built-in speakers (not illustrated in FIG. 5). WebTV dongle 2 may receive television over the air and then serving it as web content to mobile device 1.

WebTV dongle 5 may be further extended by adding a storage device on the WebTV dongle 5 to store recorded content for later playback. Alternatively, WebTV dongle 5 could be configured to record and store recorded content on a memory device of mobile device 1. Everything described for FIG. 5 with respect to mobile device 1 could also apply to other consumer electronics devices, such as a standard PC host (desktop, laptop, netbook, or tablet computer) or other types of CE devices. In the case of a standard PC host, the CDC/EEM driver installer may be initially stored on WebTV dongle 1, but can be installed on the PC upon the first connection. Similar auto-install products are available on the market for USB data cards.

Nevertheless, the solutions described herein may not require driver software installed on the host side, other than basic USB drivers. This opens the opportunity to provide over the air television services to many CE devices without additional drivers specifically for the dongle device. In addition, the solutions described herein may offer aggregation and accessibility of content of various channels including broadcast standards, 3G standards, 4G standards, all packed and wrapped with a single user interface.

Figure 6:
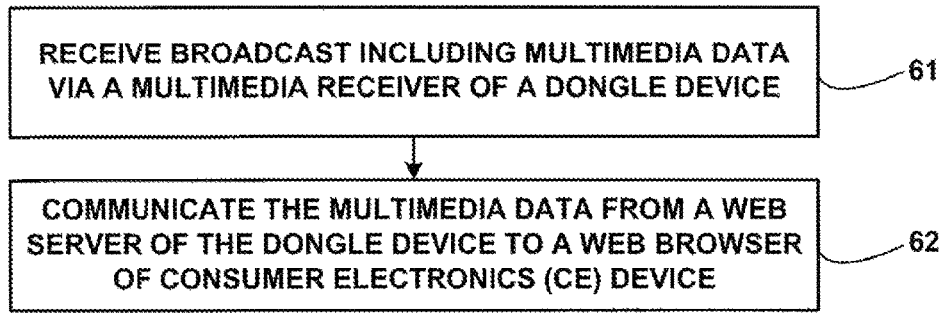
FIGS. 6 and 7 are flow diagrams illustrating techniques from the perspective a dongle device consistent with this disclosure.

FIG. 6 is a flow diagram illustrating a technique consistent with this disclosure. Dongle device 104 may receive a broadcast including multimedia data via a multimedia receiver (e.g., a TV tuner or FLO-TV tuner) in dongle device 104 (61). Dongle device then communicates the multimedia data from a web server of dongle device 104 to a web browser of CE device 102 (62).

Figure 7:
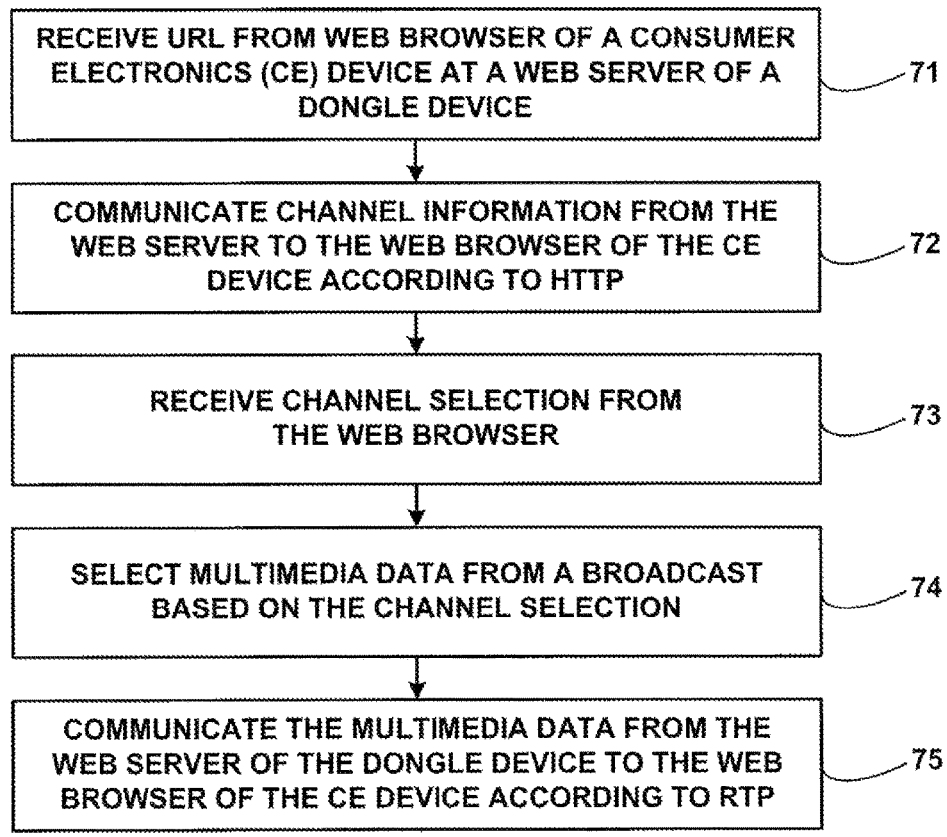

FIG. 7 is another flow diagram illustrating a technique consistent with this disclosure. A web server of dongle device 104 may receive a URL from a web browser of CE device 102 (71). In response to the URL, the web server of dongle device 104 may communicate channel information to the browser of CE device according to HTTP (72). This channel information communicated via HTTP may comprise HTML data.

The web server of dongle device 104 may then receive a channel selection from the web browser of CE device 102 (73). The user may select a channel via a graphic user interface, and the channel selection may be communicated from the web browser of CE device 102 to the web server of dongle device 104. In response to receiving the channel selection, dongle device 104 may select multimedia data from a broadcast based on the channel selection (74). Selecting the multimedia data from the broadcast may include tuning dongle device 104 (e.g., tuning multimedia receiver 218 of dongle device 212 shown in FIG. 2) to the proper frequency so as to receive the desired channel of the broadcast. The web server of dongle device 104 may then communicate the multimedia data to the web browser according to RTP (75). The web browser may then present the multimedia data to a user via a display screen of CE device 102.

The techniques of this disclosure may be implemented in a wide variety of devices or apparatuses, including a wireless communication device handset such as a mobile phone, an integrated circuit (IC) or a set of ICs (i.e., a chip set). Any components, modules or units have been described provided to emphasize functional aspects and does not necessarily require realization by different hardware units. The techniques described herein may also be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

If implemented in software, the techniques may be realized at least in part by a computer-readable medium comprising instructions that, when executed in a processor, performs one or more of the methods described above. The computer-readable medium may comprise a tangible computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

In added examples consistent with this disclosure, the framework for communication between a dongle device and an electronic device could be extended to applications unrelated to broadcasts. Accordingly, this disclosure also contemplates a dongle device comprising an interface that communicatively couples the dongle device to an electronic device, and a web server that communicates data to a web browser of the electronic device in response to a request from the web browser, wherein the request includes a URL. The URL could point to the dongle device in order to cause the dongle device to communicate channel selection information and selected multimedia data, but could also be used for other purposes, e.g., for a dongle device configured to provide other types of data or other types of services to CE device 102.

Various examples have been described in this disclosure. Although many aspects of this disclosure have been described in the context of a CE device, the dongle device described herein may be used with other electronic devices and not just CE devices. These and other examples are within the scope of the following claims.

The invention claimed is:
1. A method comprising:
receiving a broadcast that includes a plurality of channels of multimedia data and channel information at a receiver of a dongle device, the channel information including descriptors for the plurality of channels of multimedia data, wherein the dongle device communicatively couples to an electronic device via a data communications interface, wherein the data communications interface is a universal serial bus (USB) interface;

communicating the channel information from a web server in the dongle device to a web browser of the electronic device over the data communications interface;

receiving, at the web server, a channel selection from the electronic device, the channel selection indicating a selected channel of multimedia data from the plurality of channels of multimedia data;

selecting the selected channel of multimedia data from the broadcast based on the received channel selection; and streaming the selected channel of multimedia data under control of a stream manager from a streaming server in the dongle device to the web browser of the electronic device over the data communications interface, wherein streaming the selected channel of multimedia data under control of a stream manager comprises communicating the selected channel of multimedia data via the USB interface using a real time transfer protocol (RTP).

2. The method of claim 1, wherein the receiver of the dongle device comprises a broadcast television (TV) tuner.

3. The method of claim 1, wherein the web server is a hypertext transfer protocol (HTTP) server and the streaming server is a real time transfer protocol (RTP) server, the method further comprising:
receiving a request from the electronic device for the selected channel of multimedia data at the HTTP server; and
communicating the selected channel of multimedia data to the web browser via the RTP server in response to the request.

4. The method of claim 3, wherein receiving the request at the HTTP server comprises receiving a Uniform Resource Locator (URL) from the web browser, wherein the HTTP server of the dongle device is identified by the URL.

5. The method of claim 1, wherein the data communications interface is a wired USB interface, the method further comprising:
attaching the dongle device to the electronic device via the wired USB interface;
receiving, at the receiver of the dongle device and via the broadcast, channel information associated with the plurality of channels multimedia data of the broadcast; and
communicating the received channel information to the web browser of the electronic device via the wired USB interface.

6. The method of claim 1, wherein communicating the channel information from the web server in the dongle device to the web browser of the electronic device comprises communicating the channel information via a hypertext transfer protocol (HTTP).

7. The method of claim 6, wherein the web server is a hypertext transfer protocol (HTTP) server.

8. A non-transitory computer readable storage medium comprising instructions that upon execution in a processor of a dongle device cause the dongle device to:
communicatively couple the dongle device to an electronic device over a data communications interface, wherein the data communications interface is a universal serial bus (USB) interface;
receive a broadcast that includes a plurality of channels of multimedia data and channel information associated with the broadcast at a receiver of the dongle device, the channel information including descriptors for the plurality of channels of multimedia data;
communicate the channel information to a web browser of the electronic device via a web server in the dongle device;
receive, at the web server, a channel selection from the electronic device, the channel selection indicating a selected channel of multimedia data from the plurality of channels of multimedia data;
select the selected channel of multimedia data from the broadcast based on the received channel selection; and
stream the selected channel of multimedia data from a streaming server in the dongle device to the web browser of the electronic device via the USB interface using a real time transfer protocol (RTP).

9. The non-transitory computer-readable storage medium of claim 8, wherein in communicating the channel information from the web server in the dongle device to the web browser of the electronic device, the instructions cause the dongle device to communicate the channel information via a hypertext transfer protocol (HTTP).

10. The non-transitory computer-readable storage medium of claim 8, wherein the web server is a hypertext transport protocol (HTTP) server.

* * * * *